United States Patent
Maymon et al.

(10) Patent No.: US 10,567,777 B2
(45) Date of Patent: Feb. 18, 2020

(54) CONTRAST OPTIMIZATION AND LOCAL ADAPTATION APPROACH FOR HIGH DYNAMIC RANGE COMPRESSION

(71) Applicant: INTEL CORPORATION, Santa Clara, CA (US)

(72) Inventors: Shay Maymon, Raanana (IL); Hila Barel, Petach Tiqva (IL)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 15/857,447

(22) Filed: Dec. 28, 2017

(65) Prior Publication Data

US 2018/0270489 A1 Sep. 20, 2018

Related U.S. Application Data

(60) Provisional application No. 62/472,354, filed on Mar. 16, 2017.

(51) Int. Cl.
*H04N 19/182* (2014.01)
*H04N 19/186* (2014.01)
*G06T 5/00* (2006.01)

(52) U.S. Cl.
CPC ........... *H04N 19/182* (2014.11); *G06T 5/008* (2013.01); *G06T 5/009* (2013.01); *H04N 19/186* (2014.11); *G06T 2207/20208* (2013.01)

(58) Field of Classification Search
CPC ...... G06T 5/008; G06T 5/009; G06T 2207/20208; H04N 19/182; H04N 19/186
See application file for complete search history.

(56) References Cited

U.S. PATENT DOCUMENTS

| | | | | |
|---|---|---|---|---|
| 2006/0291721 | A1* | 12/2006 | Torr | G06K 9/342 382/173 |
| 2007/0182830 | A1* | 8/2007 | Katagiri | H04N 5/235 348/222.1 |
| 2014/0003715 | A1* | 1/2014 | Tsai | H04N 19/80 382/167 |
| 2015/0146997 | A1* | 5/2015 | Li | G06T 5/007 382/274 |

OTHER PUBLICATIONS

Bansal et al. ("Regularized tone mapping using edge preserving filters," Twenty First National Conference on Communications, Feb. 27-Mar. 1, 2015) (Year: 2015).*

(Continued)

*Primary Examiner* — Yubin Hung
(74) *Attorney, Agent, or Firm* — International IP Law Group, P.L.L.C.

(57) ABSTRACT

An apparatus is described herein. The apparatus comprises a controller, a logarithmic tone-reproduction operator, a processor, and a compressor. The controller is to calculate a regularization term and a contrast preservation term of an objective function. The logarithmic tone-reproduction operator is to produce a reference image. The processor is to obtain a compressed luminance from the objective function as applied to the reference image. The compressor is to compress a high dynamic range (HDR) image by applying a gain term to the HDR image based on the compressed luminance.

25 Claims, 4 Drawing Sheets

(56) References Cited

OTHER PUBLICATIONS

Ogata et al. ("Dynamic range compression based on illumination compensation," IEEE Transactions on Consumer Electronics, vol. 47, No. 3, Aug. 2001) (Year: 2001).*

Cvetkovic et al. ("Non-linear locally-adaptive video contrast enhancement algorithm without artifacts," IEEE Transactions on Consumer Electronics, vol. 54. No. 1, Feb. 2008) (Year: 2008).*

Li et al. ("High dynamic range compression by half quadratic regularization," 16th IEEE International Conference on Image Processing, Nov. 7-10, 2009) (Year: 2009).*

Tsai ("A Fast Dynamic Range Compression With Local Contrast Preservation Algorithm and Its Application to Real-Time Video Enhncement," IEEE Transactions on Multimedia, vol. 14, No. 4, Aug. 2012) (Year: 2012).*

\* cited by examiner

CONTRAST OPTIMIZATION AND LOCAL ADAPTATION APPROACH FOR HIGH DYNAMIC RANGE COMPRESSION

CROSS REFERENCE TO RELATED APPLICATION

The present application claims the benefit of the filing date of U.S. Patent Provisional Application Ser. No. 62/472,354, by Shay Maymon et al., entitled "CONTRAST OPTIMIZATION AND LOCAL ADAPTATION APPROACH FOR HIGH DYNAMIC RANGE COMPRESSION," filed Mar. 16, 2017, and which is incorporated herein by reference.

BACKGROUND ART

High Dynamic Range (HDR) imaging is a technique used in imaging and photography to reproduce a greater dynamic range of luminosity than is possible with standard digital imaging or photographic techniques. HDR imaging is used to present a range of luminance that is similar to the luminance experienced through the human visual system. The human eye, through adaptation of the iris and other methods, adjusts constantly to adapt to a broad range of luminance present in the environment. The brain continuously interprets this information so that a viewer can see in a wide range of light conditions.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

HDR images or videos can be realized via larger pixel values to represent the full range of an HDR image. HDR images often represent a range of luminance similar to that of the human visual system. Thus, the HDR images often reproduce a greater dynamic range of luminosity than is possible with standard digital imaging or photographic techniques. With the increased requirements in terms of pixel processing and higher dynamic range values, the image processing units require more and more bandwidth to process these images. Due to the limitations of printing and display contrast, the extended luminosity range of an HDR image has to be compressed for printing and display so that an approximation of the extended luminosity range is made visible.

A technique of rendering an HDR image to a standard monitor or printing device is called tone mapping, which is a form of HDR compression. This technique reduces the overall contrast of an HDR image to facilitate display on devices or printouts with lower dynamic range. Various tone mapping solutions have been developed. These approaches can be classified into two categories: global tone reproduction curves (TRC) and local tone reproduction operators (TRO).

With global TRC, transformations are based on the luminance and other global variables of the image that adjust the intensity of each pixel using a function that is independent of the local spatial context. Typically, global TRC techniques are simple and fast, but they can cause a loss of contrast. The local TRO techniques include context sensitive approaches which attempt to preserve local contrast by using the spatial structure of the image. These types of algorithms are often more complicated than TRCs, and can show artifacts (such as halos and gradient reversals) and have an unrealistic look. However, TRO techniques can also provide the best appearance since human vision is mainly sensitive to local contrast, when compared to other tone mapping solutions, such as global TRC techniques.

Embodiments described herein enable high dynamic range compression to enable the display of HDR images. In embodiments, the present techniques assume that the human visual system is not particularly sensitive to absolute luminance reaching the retina, but rather responds to relative luminance ratios and local intensity ratio changes. Thus, the present techniques optimize a local contrast throughout an image. The dynamic range compression is formulated as a regularized optimization in which the image dynamic range is reduced while a local contrast of the original scene is preserved. In embodiments, the present techniques can be used for still HDR image capture as well as HDR video capture. Additionally, with small modifications the present techniques can be used for other classic local tone mapping use cases such as local contrast enhancement and dehazing.

The present techniques result in equal or better results with respect to image quality than the leading competitors and latest academic solutions to dynamic range compression. Moreover, the present techniques are capable of drastic dynamic range compression, while preserving fine details and avoiding common artifacts such as halos, gradient reversals, or loss of local contrast. Further, the computational cost of the present techniques is very low due to the simplification of the solution to a linear model in which the unknown parameters are linearly related to the observations. In addition, a substantial part of the present techniques are parallel in nature, which are fully optimized for execution on mobile platforms via acceleration on a central processing unit (CPU) or graphics processing unit (GPU).

For example, on a 3.6 GHz central processing unit (CPU) one megapixel may be processed in about a 100 milliseconds (ms) using a single thread. This processing can be even more accelerated using multithreading or a GPU implementation. The present techniques are better in both overall contrast and shadow visibility to when compared to solutions such as Local Laplacian Filtering and image tone mapping with a simple gamma curve (global tone mapping type) for dynamic range compression. In particular, the present techniques can reproduce the visibility of details in highlights more than global tone mapping and looks more natural by avoiding the HDR unrealistic appearance compared to Local Laplacian Filtering.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
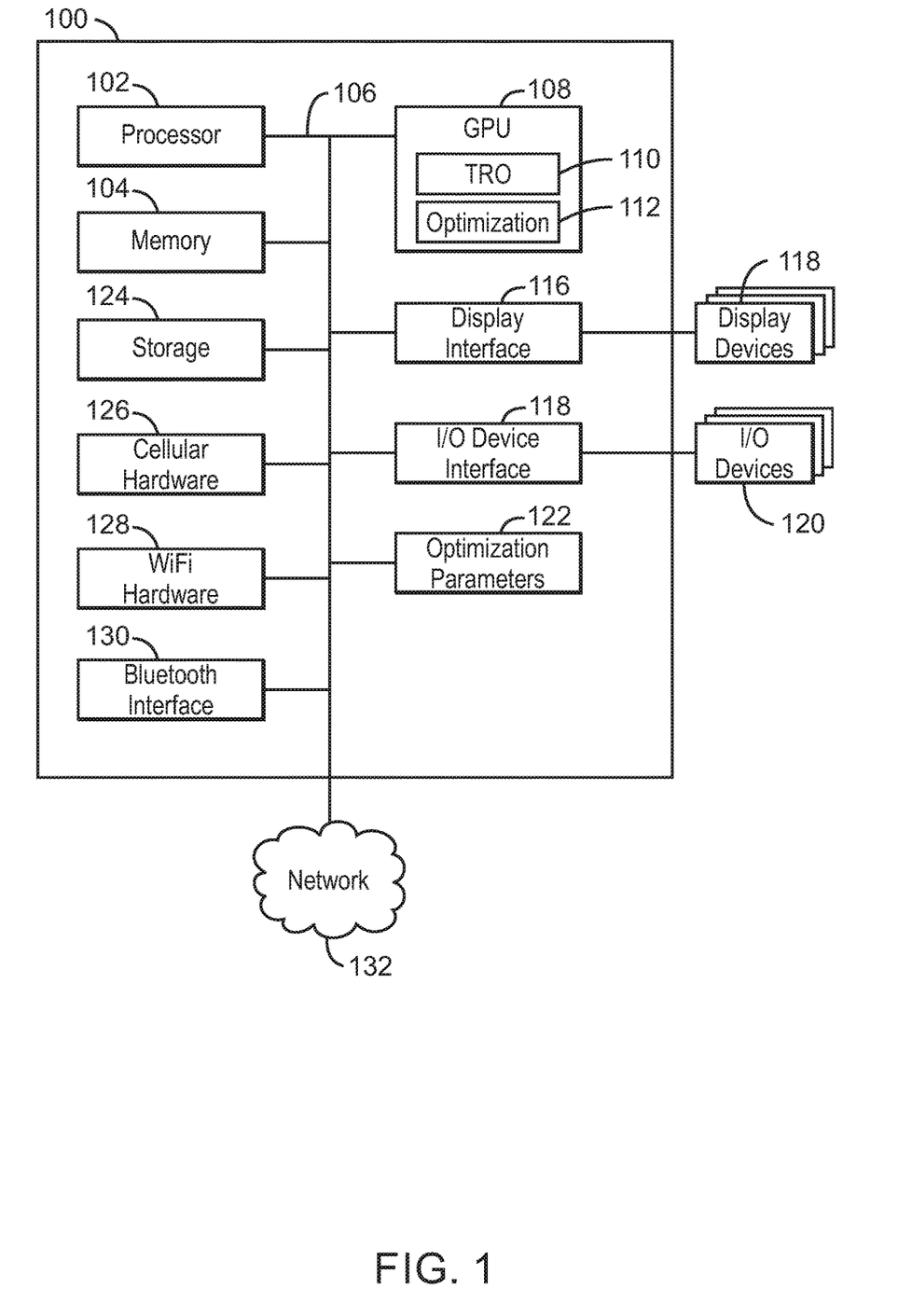
FIG. 1 is a block diagram of an electronic device that enables contrast optimization and local adaptation for HDR compression.

FIG. 1 is a block diagram of an electronic device 100 that enables contrast optimization and local adaptation for HDR compression. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads.

In embodiments, the GPU 108 includes a tone reproduction operator (TRO) mechanism 110 and an optimization mechanism 112. The TRO mechanism 110 can be used to calculate a reference image whose histogram is compressed. In embodiments, a histogram of an image is a graphical representation of the tonal distribution in the image. The optimization mechanism 112 may solve an optimization problem as described below via synchronous iterations. In embodiments, optimization parameters 122 may be calculated via a plurality of controls and used by each of the TRO mechanism 110 and the optimization mechanism 112.

The CPU 102 can be linked through the bus 106 to a display interface 116 configured to connect the electronic device 100 to one or more display devices 118. The display devices 118 can include a display screen that is a built-in component of the electronic device 100. The display devices 118 can also include a computer monitor, television, or projector, among others, that is externally connected to the electronic device 100.

The CPU 102 can also be connected through the bus 106 to an input/output (I/O) device interface 118 configured to connect the electronic device 100 to one or more I/O devices 120. The I/O devices 120 can include, for example, a keyboard and a pointing device, wherein the pointing device can include a touchpad or a touchscreen, among others. The I/O devices 120 can be built-in components of the electronic device 100, or can be devices that are externally connected to the electronic device 100.

The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 100 may access any network 132 without being tethered or paired to another device, where the network 132 is a cellular network.

The CPU 102 may also be linked through the bus 106 to WiFi hardware 128. The WiFi hardware is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP), where the network 132 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the electronic device 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

As discussed above, the human eye is sensitive to relative, rather than absolute luminance values. It is therefore possible to produce images that convey the appearance of HDR scenes on limited dynamic-range (LDR) display mediums. Motivated by this principle of the human visual system, the present techniques produce a reduced DR image whose local contrast matches the original scene's local contrast. In embodiments, the measure of contrast may be defined as follows. First, denote Y as the luminance of the HDR image and $$B = \log(Y) \qquad \text{Eqn. 1}$$

where B is an approximation of a perceived brightness of the image. The contrast $C_{i,j}$ between pixels i and j is then defined as the logarithm of their luminance ratios, or alternatively as the difference between their brightness levels as follows:

$$C_{i,j} = \log\left(\frac{Y_i}{Y_j}\right) = B_i - B_j \qquad \text{Eqn. 2}$$

Applying the logarithm function on the luminance produces an approximation of the perceived brightness. Additionally, the use of the logarithm function enables a linear relationship between the unknown parameters which are the brightness levels of the desired image and the known observations $C_{i,j}$.

In embodiments, the present techniques are to match the contrast of the displayed image to that of the original image. However, if dynamic range compression is desired, preserving all luminance ratios is impossible. Certain ratios may be more visually significant than other ratios of the image. These visually significant ratios should be preserved first. In embodiments, a visually significant ratio is one that can be visually perceived by the human eye. Mathematically formulating the problem of dynamic range compression with contrast preservation, the following objective function is obtained:

$$\min_{\{\hat{B}_i\} \leq 0} \left\{ \left( \sum_{i \neq j} w_{i,j} |C_{i,j} - (\hat{B}_i - \hat{B}_j)|^p \right) + \lambda \sum_i |\hat{B}_i - R_i|^2 \right\} \qquad \text{Eqn. 3}$$

The objective function results in a brightness level $\hat{B}$ of the desired output image pixel. This desired brightness level $\hat{B}$ can be used to calculate a desired luminance $\hat{Y}$ of the reduced dynamic range image as follows:

$$\hat{Y} = \exp(\hat{B}) \qquad \text{Eqn. 4}$$

The optimization is constrained since Y lies in a displayable range [0,1] and thus $\hat{B} = \log \hat{Y}$ is restricted to be non-positive. Dividing the desired luminance $\hat{Y}$ by the luminance Y of the HDR image yields a gain which can be multiplied by each of the RGB channels of the HDR image to produce the low dynamic range image. The resulting low dynamic range image maintains the contrast ratios found in the original image.

The objective function consists of two terms. The first term $\{(\Sigma_{i \neq j} w_{i,j} | (C_{i,j} - (\hat{B}_i - \hat{B}_j) |^p)\}$ enables contrast preservation, and may be referred to as a contrast preservation term. The second term $\lambda \Sigma_i |\hat{B}_i - R_i|^2$ is a regularization term whose role is dynamic-range compression. The amount of regularization is controlled by a regularization parameter $\lambda$, which balances contrast preservation with the reduction in dynamic range. Accordingly, the regularization parameter is to introduce information to the objective function in order to solve the objective function by controlling an amount of regularization. The contrast preserving term ensures that the contrast of the resulting image will be close to that of the original image in a sense of a small weighted p-norm. Note that when p is large, the optimization function in Eqn. 3 will be better suited for matching pairs of high contrast pixels on the expense of matching low-contrast pairs of pixels.

The weighting factor $w_{i,j}$ determines the relative importance of preserving contrast ratios between pairs of pixels in the image. Since it is not possible to preserve all contrast ratios, w will define which ratios are more important to preserve. For pixel i, the weighting factor $w_{i,j} = 1$ if pixel j is adjacent to or in a neighborhood of pixel i. Otherwise, for pixel i, the weighting factor $w_{i,j} = 0$ if pixel j is not adjacent to or in the neighborhood of pixel i. As used herein, the neighborhood or region is defined by an Euclidean distance between pixel i and pixel j. In embodiments, the neighborhood may be defined according to characteristics of the human visual system. The size of the neighborhood may affect a computational complexity of the solution.

The regularization term $\lambda \Sigma_i |\hat{B}_i - R_i|^2$ enables the resulting image to be close in the least-squares sense to a reference image R, whose dynamic range is reduced relative to that of the original HDR image. On one hand $\hat{B}$ has to be close to the reference image R, which will be specified below, and whose dynamic range is reduced relative to that of the original HDR image. On the other hand, $\hat{B}$ should be such that the local contrast of the resulting image will be close to that of the original image.

When the regularization parameter $\lambda$ approaches infinity, solving the optimization above yields the desired brightness equals the brightness of the reference image, or $\hat{B} = R$. As $\lambda$ is decreased, the local contrast of the displayed image is improved and more details from the original image are restored in the final LDR image. When $\lambda = 0$, the objective function can be solved with zero error if $\hat{B}$ is substituted for the brightness of the original HDR image or any scale of it that satisfies the non-positive constraint. The regularization term is therefore needed in the objective function to achieve a reduced dynamic range solution and to avoid solutions that satisfy the contrast matching criterion but whose dynamic ranges are as high as that of the original scene.

As mentioned above, the role of the regularization term in the objective function above is to reduce the dynamic range of the original scene. This is achieved by forcing the brightness of the desired output image to be close in the least-squares sense (wherein the $l_2$-norm is minimized) to the reference image R. In embodiments, the reference image is produced with a logarithmic tone-reproduction operator (TRO), in which a context of each pixel is observed in its mapping according to the following equation:

$$g_i(Y_i) = \frac{\log(Y_i + \beta \overline{Y}_i^\gamma) - \log(\beta \overline{Y}_i^\gamma)}{\log(1 + \beta \overline{Y}_i^\gamma) - \log(\beta \overline{Y}_i^\gamma)}, \quad \text{Eqn. 5}$$

$$\beta > 0, \gamma > 0$$

Where $\overline{Y}_i$ is a local Geometric mean of luminance values around pixel i and the parameters $\beta$ and $\gamma$ are image dependent constants. The local Geometric mean of luminance values $\overline{Y}_i$ will be low for dark regions of the image and high for bright regions. As used herein, local refers to a particular neighborhood or region surrounding pixel i. This local behavior of $\overline{Y}_i$ has the effect of more expanding dark regions and less compressing bright regions; it will thus preserve more details of the original scene. The use of a logarithmic TRO that is a function of the local Geometric mean of luminance values $\overline{Y}_i$ enables an increased differentiation between dark and light regions of the image when compared to a global function applied to the entire image. Using this mapping, the luminance Y of the HDR image is mapped to g(Y) from which the reference brightness image R=log(g(Y)) is obtained.

In particular, for the case of p=2, or an $l_2$-norm, the optimization problem reduces to a regularized least-squares optimization with inequality constraints. In a vector-matrix form, the objective function becomes:

$$\min_{\hat{b} \leq 0}\left\{\|H\hat{b} - c\|_W^2 + \lambda\|\hat{b} - r\|^2\right\} \quad \text{Eqn. 6}$$

The matrix H is a sparse matrix of size M×$N_p$, where M is the number of selected pairs included in the contrast matching term, and $N_p$ is the total number of pixels in the image. Each row of H that corresponds to pixels i and j has all its entities zeros except the i-th and j-th which take the values 1 and −1, respectively. Moreover, $\hat{b}$ is a column vector representing the brightness of the desired image, c is a column vector whose values represent the desired relative intensity ratios of all pairs, W is a diagonal weighting matrix whose entities on the diagonal are $w_{i,j}$, and r is a column vector that represents the reference image whose brightness levels are $R_i$.

In designing the LDR image, the relative ratios of luminance between neighboring pixels will be more important to preserve than relative ratios of pixels that are farther apart. Hence, more importance is given to contrast between adjacent pixels. To reduce the computational cost, $w_{i,j}=1$ is selected between adjacent pixels and $w_{i,j}=0$ for pixels that are farther away. Since all nonzero weights are unity, the matrix W is reduced to the identity matrix and can therefore be omitted in the above form.

Matching the local contrast of the displayed image to that of the original scene may reveal some difficulties around strong edges. Specifically, the high local contrast around strong edges together with the unforgiving behavior of the $l_2$-norm to large errors results in over-exaggerated contrast, referred to as halos. By controlling $\lambda$, special processing can be applied to the edges of the image. The halos artifact is mitigated by gradually increasing the regularization parameter $\lambda$ in regions that are detected as strong edges. In embodiments, strong edges may be detected by any edge detection technique. For example, a high pass filter may be used to determine strong edges of the image. The regularization parameter $\lambda$ is gradually increased in the vicinity of strong edges to reduce the importance of local contrast preservation in favor of matching the reference image R, whose contrast is reduced.

The constrained optimization problem may be computationally demanding. In embodiments, iterated conditional modes (ICM) can be used to reduce computational complexity and efficiently determine a compressed luminance output $Y_{LDR}$ by iteratively solving the optimization problem. The computational cost of the proposed iterative procedure is significantly improved as compared to methods that solve for all unknown parameters at once.

The ICM technique is an application of a coordinate-wise gradient ascent. It consists of a local computation that can be performed efficiently. This local computation can be repeated in a systematic way, for instance by repeatedly raster scanning through the image, or by choosing nodes at random, until some suitable stopping criterion is satisfied. The present techniques will result in convergence to a local optimum if no changes are made to the variables in a sequence of updates where every node is visited at least once. Since the present objective function is convex, the algorithm will converge to a global optimum. In experiments with synchronous updating, the iterative technique converges to the optimal solution in less than twenty iterations. It is also worth noting that synchronous updating of the parameters can be accelerated via parallelization on processing units with parallel processing.

Figure 2:
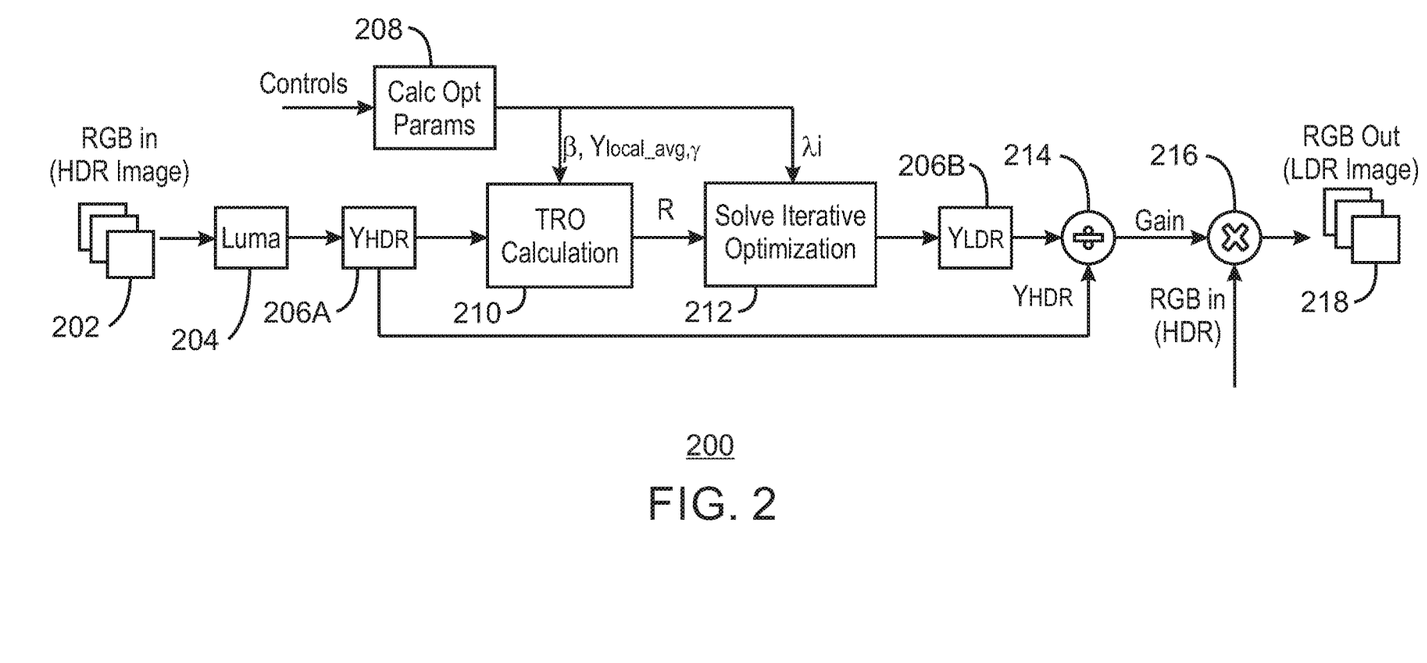
FIG. 2 is a process flow diagram of a method that enables contrast optimization and local adaptation for HDR compression.

FIG. 2 is a process flow diagram of a method 200 that enables contrast optimization and local adaptation for HDR compression. At block 202, a red, green, blue (RGB) HDR image is obtained. The present techniques may operate on the luminance of the RGB image in the linear domain, and as such the colors remain unchanged. At block 204 a luminance is selected as a maximum luminance of the RGB channels as follows:

$$Y = \max(R, G, B) \quad \text{Eqn. 7}$$

where the luminance Y is the maximum value of the R, G, or B channel input. By selecting the luminance from the RGB values, none of the RGB channels will exceed the displayable range when multiplied with the gain representing the ratio between the luminance after compression and the luminance of the HDR image in later calculations. The perceived brightness may be calculated via Eqn. 1 above, where the perceived brightness B is the logarithm of the luminance Y.

At block 208, optimization parameters may be calculated. The optimization parameters include a regularization parameter ($\lambda$), a local average brightness $\overline{Y}_i$, a tuning parameter $\beta$, gamma value $\gamma$. The tuning parameter $\beta$ and gamma value $\gamma$ are content-dependent constants. In embodiments, the local average brightness $\overline{Y}_i$ is an average of brightness in a particular area of an image. Throughout the image, various regions or neighborhoods of each pixel have a local average brightness $\overline{Y}_i$ calculated based on pixel values of the respective region or neighborhood. In embodiments, the regularization parameter ($\lambda$) is a weight function that balances contrast preservation with a reduction in dynamic range as illustrated by Eqn. 3 above.

The optimization parameters may be used by the TRO calculations at block 210 and to solve the iterative optimization at block 212. In particular, at block 210 a logarithmic tone-reproduction operator (TRO) is applied to the input image to generate a reference image with a reduced dynamic range. The histogram of the reference image may be compressed using tone reproductive operators. In embodiments, the logarithmic TRO uses a context of each pixel in its mapping. The logarithmic TRO may be as described in Eqn. 5 above.

At block 212, a luminance of the compressed image is computed by iteratively solving the constrained least-squares optimization using ICM with synchronous updating where the reference image from block 210 is used as an initialization. The output of ICM at block 212 is a compressed luminance output $Y_{LDR}$ at block 206B. The luminance $Y_{HDR}$ from block 206A may be divided by the resulting compressed luminance output $Y_{LDR}$ from block 206B to obtain a gain representing the ratio between the luminance after compression and the luminance of the original HDR image. At block 216, the gain may be multiplied by each of the R,G,B channels of the HDR image to compress the HDR image and obtain an LDR image at block 218. In this manner, the image dynamic range is reduced while the local contrast of the original scene is preserved.

Figure 3:
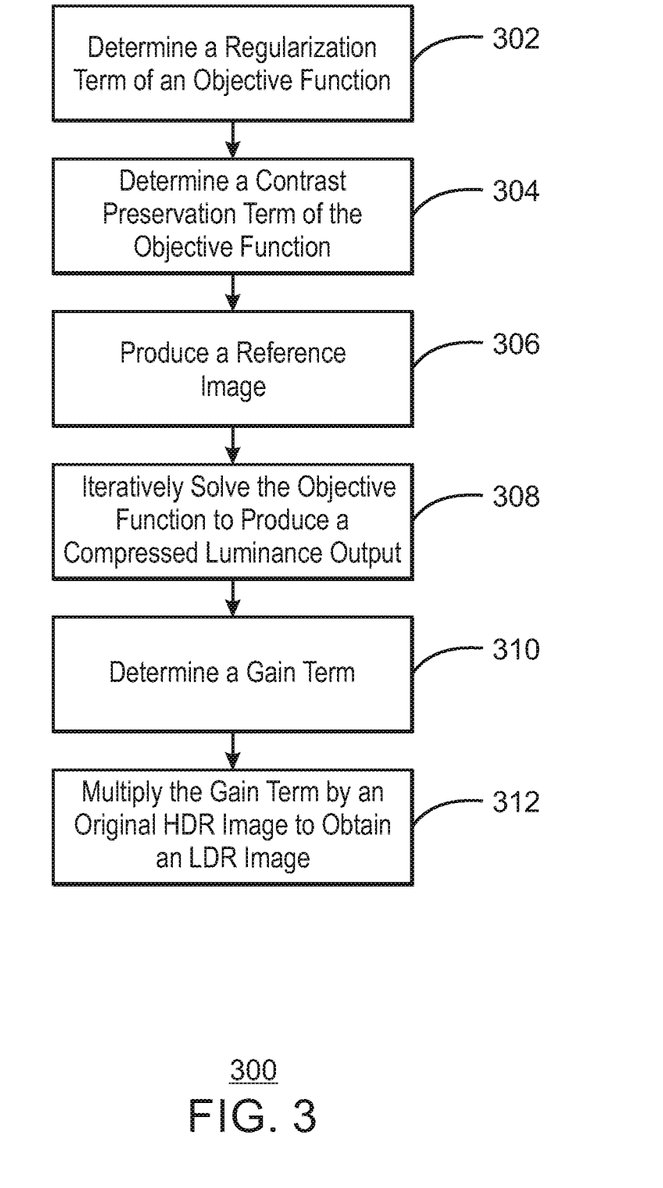
FIG. 3 is a process flow diagram of a method for contrast optimization and local adaptation for HDR compression.

FIG. 3 is a process flow diagram of a method 300 for contrast optimization and local adaptation for HDR compression. At block 302, a regularization term is determined. In embodiments, the regularization term is to enable dynamic range compression. The regularization term may produce an image whose dynamic range is reduced relative to that of the original HDR image. The regularization term may include a regularization parameter. When the regularization parameter approaches infinity, a desired brightness is equal to the brightness of the reference image. When the regularization parameter is decreased, the local contrast is increased, and more details are restored in the final image. When the regularization parameter is equal to 0, the objective function can be solved with zero error if $\hat{B}$ is substituted for the brightness of the original HDR image or any scale of it that satisfies the non-positive constraint. The regularization term is to prevent a dynamic range of a final image from being equal to the dynamic range of the reference image. In embodiments, the regularization parameter is increased as the likelihood that the current neighborhood includes a strong edge is increased.

At block 304, a contrast preservation term is determined. In embodiments, the contrast preservation term preserves contrast ratios of pixel pairs in a neighborhood of a current pixel. A weighting factor may be applied to pixel pairs to determine the significance of contrast ratios of the current region. A significant contrast ratio may be a contrast ratio between the current pixel and a pixel in its neighborhood. In embodiments, the relative ratios of luminance between neighboring pixels will be more important to preserve than relative ratios of pixels that are farther apart.

At block 306, a reference image is produced with a logarithmic tone-reproduction operator (TRO). In embodiments, the optimization parameters include the local average brightness $\overline{Y}_i$ and the parameters $\beta$ and $\gamma$ which are image dependent constants. In embodiments, the histogram of the reference image is compressed using tone reproductive operators. The reference image is processed through the logarithmic TRO function to map the luminance Y of the HDR image to g(Y), from which the reference brightness image R=log(g(Y)) is obtained.

At block 308, the objective function is solved iteratively to produce a compressed luminance output $Y_{LDR}$. In embodiments, an iterated conditional mode (ICM) is used to solve the objective function. The objective function may be solved via a processor with a plurality of processing cores that are to operate in parallel. The processor may be an embedded processor, microcontroller, central processing unit, graphics processing unit, and the like. At block 310, a luminance $Y_{HDR}$ is divided by the compressed luminance output $Y_{LDR}$ to determine a gain term. At block 312, the gain term may be multiplied by an original HDR image to obtain an LDR image. In embodiments, the optimal contrast is obtained by solving the optimization problem described above via a synchronous iterations technique to produce the compressed luminance output.

Figure 4:
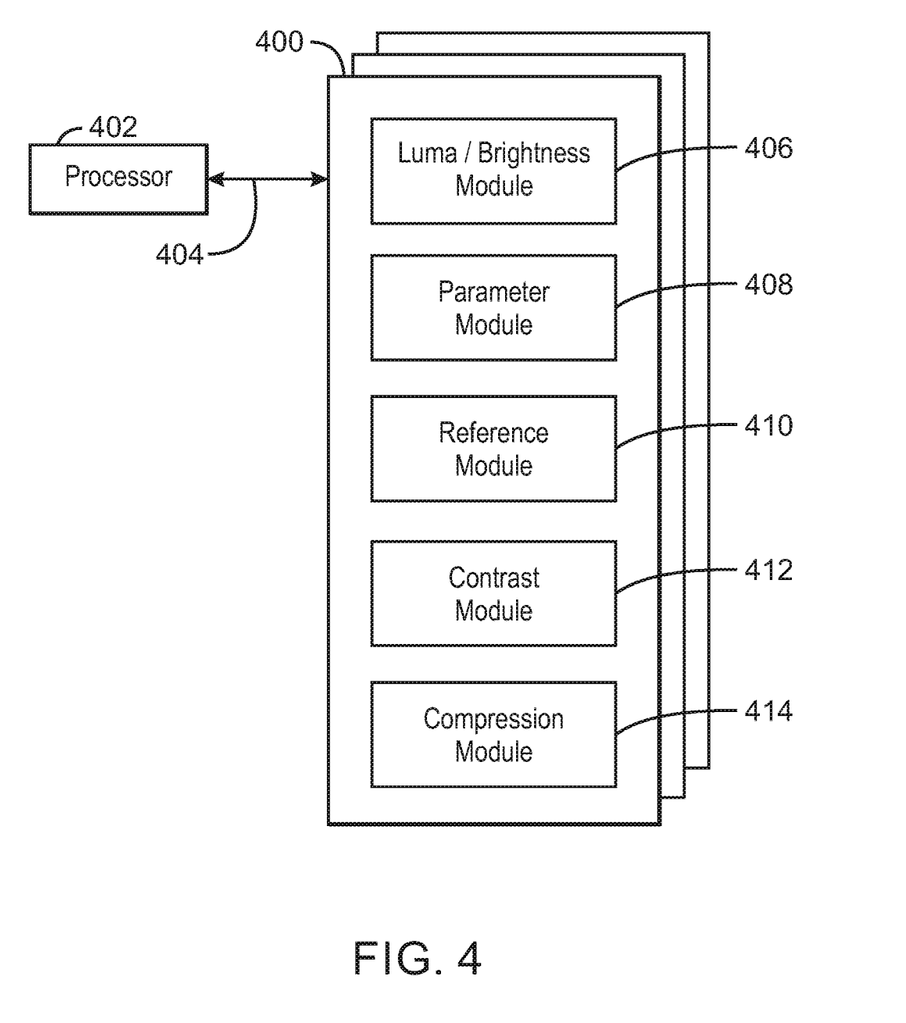
FIG. 4 is a block diagram showing a medium that contains logic for contrast optimization and local adaptation for HDR compression.

FIG. 4 is a block diagram showing a medium 400 that contains logic for contrast optimization and local adaptation for HDR compression. The medium 400 may be a computer-readable medium, including a non-transitory medium that stores code that can be accessed by a processor 402 over a computer bus 404. For example, the computer-readable medium 400 can be volatile or non-volatile data storage device. The medium 400 can also be a logic unit, such as an Application Specific Integrated Circuit (ASIC), a Field Programmable Gate Array (FPGA), or an arrangement of logic gates implemented in one or more integrated circuits, for example.

The medium 400 may include modules 406-414 configured to perform the techniques described herein. For example, a luminance/brightness module 406 may be configured to capture the luminance and brightness. A parameter module 408 may be configured to calculate parameter values based on control values. A reference module 410 may be configured to calculate a reference image. A contrast module 412 may be configured to optimize the contrast of the image. A compression module 414 may be configured to compress the image by applying a gain to the R,G,B channels of the image. In some embodiments, the modules 406-414 may be modules of computer code configured to direct the operations of the processor 402.

The block diagram of FIG. 4 is not intended to indicate that the medium 400 is to include all of the components shown in FIG. 4. Further, the medium 400 may include any number of additional components not shown in FIG. 4, depending on the details of the specific implementation.

Example 1 is an apparatus. The apparatus includes a controller to calculate a regularization term and a contrast preservation term of an objective function; a logarithmic tone-reproduction operator to produce a reference image; a processor to obtain a compressed luminance from the objective function as applied to the reference image; and a compressor to compress a high dynamic range (HDR) image by applying a gain term to the HDR image based on the compressed luminance.

Example 2 includes the apparatus of example 1, including or excluding optional features. In this example, the compressor is to divide the luminance $Y_{HDR}$ by the compressed luminance $Y_{LDR}$ to determine the gain term.

Example 3 includes the apparatus of any one of examples 1 to 2, including or excluding optional features. In this example, the processor is to implement an iterated conditional mode to obtain the compressed luminance.

Example 4 includes the apparatus of any one of examples 1 to 3, including or excluding optional features. In this example, the controller is to modify a regularization parameter of the regularization term to introduce additional information to the objective function.

Example 5 includes the apparatus of any one of examples 1 to 4, including or excluding optional features. In this example, the regularization term comprises a regularization parameter that increases as a likelihood that a neighborhood of the reference image contains a strong edge increases.

Example 6 includes the apparatus of any one of examples 1 to 5, including or excluding optional features. In this example, the contrast preservation term comprises a weighting factor to determine significant contrast ratios of a current neighborhood of pixels.

Example 7 includes the apparatus of any one of examples 1 to 6, including or excluding optional features. In this example, the contrast preservation term is to maintain relative ratios of luminance between neighboring pixels.

Example 8 includes the apparatus of any one of examples 1 to 7, including or excluding optional features. In this example, the logarithmic tone-reproduction operator is to calculate the reference image by compressing an input image.

Example 9 includes the apparatus of any one of examples 1 to 8, including or excluding optional features. In this example, the compressed luminance is obtained via an iterative solution of the objective function.

Example 10 includes the apparatus of any one of examples 1 to 9, including or excluding optional features. In this example, optimization parameters are applied to the logarithmic tone-reproduction operator and the objective function.

Example 11 is a method. The method includes calculating, via a processor, a regularization term and a contrast preservation term of an objective function; producing a reference image; obtaining a compressed luminance from the objective function as applied to the reference image; and compressing a high dynamic range (HDR) image by applying a gain term to the HDR image based on the compressed luminance.

Example 12 includes the method of example 11, including or excluding optional features. In this example, a luminance $Y_{HDR}$ is divided by the compressed luminance $Y_{LDR}$ to determine the gain term.

Example 13 includes the method of any one of examples 11 to 12, including or excluding optional features. In this example, the compressed luminance is obtained via an iterated conditional mode.

Example 14 includes the method of any one of examples 11 to 13, including or excluding optional features. In this example, method of claim 11, the regularization term comprises a regularization parameter to introduce additional information to the objective function to solve the objective function.

Example 15 includes the method of any one of examples 11 to 14, including or excluding optional features. In this example, the regularization term comprises a regularization parameter that increases as a likelihood that a neighborhood of the reference image contains a strong edge increases.

Example 16 includes the method of any one of examples 11 to 15, including or excluding optional features. In this example, the contrast preservation term comprises a weighting factor to determine significant contrast ratios of a current neighborhood of pixels.

Example 17 includes the method of any one of examples 11 to 16, including or excluding optional features. In this example, the contrast preservation term is to maintain relative ratios of luminance between neighboring pixels.

Example 18 includes the method of any one of examples 11 to 17, including or excluding optional features. In this example, a logarithmic tone-reproduction operator is to produce the reference image by compressing an input image.

Example 19 includes the method of any one of examples 11 to 18, including or excluding optional features. In this example, the compressed luminance is obtained via an iterative solution of the objective function.

Example 20 includes the method of any one of examples 11 to 19, including or excluding optional features. In this example, optimization parameters are applied to a logarithmic tone-reproduction operator and the objective function.

Example 21 is a system. The system includes a display to render at least one limited dynamic range (LDR) image; a memory that is to store instructions and that is communicatively coupled to the display; and a processor communicatively coupled to the display and the memory, wherein when the processor is to execute the instructions, the processor is to: calculate a regularization term and a contrast preservation term of an objective function; produce a reference image; obtain a compressed luminance from the objective function as applied to the reference image; and compress an HDR image by applying a gain based on the compressed luminance to the HDR image to obtain an LDR image.

Example 22 includes the system of example 21, including or excluding optional features. In this example, a luminance $Y_{HDR}$ is divided by the compressed luminance $Y_{LDR}$ to determine the gain term.

Example 23 includes the system of any one of examples 21 to 22, including or excluding optional features. In this example, the compressed luminance is obtained via an iterated conditional mode.

Example 24 includes the system of any one of examples 21 to 23, including or excluding optional features. In this example, system of claim 21, the regularization term comprises a regularization parameter to introduce additional information to the objective function to solve the objective function.

Example 25 includes the system of any one of examples 21 to 24, including or excluding optional features. In this example, the regularization term comprises a regularization parameter that increases as a likelihood that a neighborhood of the reference image contains a strong edge increases.

Example 26 includes the system of any one of examples 21 to 25, including or excluding optional features. In this example, the contrast preservation term comprises a weighting factor to determine significant contrast ratios of a current neighborhood of pixels.

Example 27 includes the system of any one of examples 21 to 26, including or excluding optional features. In this example, the contrast preservation term is to maintain relative ratios of luminance between neighboring pixels.

Example 28 includes the system of any one of examples 21 to 27, including or excluding optional features. In this example, a logarithmic tone-reproduction operator is to produce the reference image by compressing an input image.

Example 29 includes the system of any one of examples 21 to 28, including or excluding optional features. In this example, the compressed luminance is obtained via an iterative solution of the objective function.

Example 30 includes the system of any one of examples 21 to 29, including or excluding optional features. In this example, optimization parameters are applied to a logarithmic tone-reproduction operator and the objective function.

Example 31 is at least one non-transitory machine-readable medium having instructions stored therein that. The computer-readable medium includes instructions that direct the processor to calculate, via a processor, a regularization term and a contrast preservation term of an objective function; produce a reference image; obtain a compressed luminance from the objective function as applied to the reference image; and compress a high dynamic range (HDR) image by applying a gain term at least partially based on the compressed luminance to the HDR image.

Example 32 includes the computer-readable medium of example 31, including or excluding optional features. In this example, a luminance $Y_{HDR}$ is divided by the compressed luminance $Y_{LDR}$ to determine the gain term.

Example 33 includes the computer-readable medium of any one of examples 31 to 32, including or excluding optional features. In this example, the compressed luminance is obtained via an iterated conditional mode.

Example 34 includes the computer-readable medium of any one of examples 31 to 33, including or excluding optional features. In this example, machine-readable medium of claim 31, the regularization term comprises a regularization parameter to introduce additional information to the objective function to solve the objective function.

Example 35 includes the computer-readable medium of any one of examples 31 to 34, including or excluding optional features. In this example, the regularization term comprises a regularization parameter that increases as a likelihood that a neighborhood of the reference image contains a strong edge increases.

Example 36 includes the computer-readable medium of any one of examples 31 to 35, including or excluding optional features. In this example, the contrast preservation term comprises a weighting factor to determine significant contrast ratios of a current neighborhood of pixels.

Example 37 includes the computer-readable medium of any one of examples 31 to 36, including or excluding optional features. In this example, the contrast preservation term is to maintain relative ratios of luminance between neighboring pixels.

Example 38 includes the computer-readable medium of any one of examples 31 to 37, including or excluding optional features. In this example, a logarithmic tone-reproduction operator is to produce the reference image by compressing an input image.

Example 39 includes the computer-readable medium of any one of examples 31 to 38, including or excluding optional features. In this example, the compressed luminance is obtained via an iterative solution of the objective function.

Example 40 includes the computer-readable medium of any one of examples 31 to 39, including or excluding optional features. In this example, optimization parameters are applied to a logarithmic tone-reproduction operator and the objective function.

Example 41 is an apparatus. The apparatus includes instructions that direct the processor to a means to calculate a regularization term and a contrast preservation term of an objective function; a logarithmic tone-reproduction operator to produce a reference image; a processor to obtain a compressed luminance from the objective function as applied to the reference image; and a means to compress a high dynamic range (HDR) image by applying a gain term to the HDR image based on the compressed luminance.

Example 42 includes the apparatus of example 41, including or excluding optional features. In this example, the means to compress an HDR image is to divide a luminance $Y_{HDR}$ by the compressed luminance $Y_{LDR}$ to determine the gain term.

Example 43 includes the apparatus of any one of examples 41 to 42, including or excluding optional features. In this example, the processor is to implement an iterated conditional mode to obtain the compressed luminance.

Example 44 includes the apparatus of any one of examples 41 to 43, including or excluding optional features. In this example, the means to calculate the regularization term and the contrast preservation term is to modify a regularization parameter of the regularization term to introduce additional information to the objective function.

Example 45 includes the apparatus of any one of examples 41 to 44, including or excluding optional features. In this example, the regularization term comprises a regularization parameter that increases with the likelihood that a neighborhood of the reference image contains a strong edge increases.

Example 46 includes the apparatus of any one of examples 41 to 45, including or excluding optional features. In this example, the contrast preservation term comprises a weighting factor to determine significant contrast ratios of a current neighborhood of pixels.

Example 47 includes the apparatus of any one of examples 41 to 46, including or excluding optional features. In this example, the contrast preservation term is to maintain relative ratios of luminance between neighboring pixels.

Example 48 includes the apparatus of any one of examples 41 to 47, including or excluding optional features. In this example, the logarithmic tone-reproduction operator is to calculate the reference image by compressing an input image.

Example 49 includes the apparatus of any one of examples 41 to 48, including or excluding optional features. In this example, the compressed luminance is obtained via an iterative solution of the objective function.

Example 50 includes the apparatus of any one of examples 41 to 49, including or excluding optional features. In this example, optimization parameters are applied to the logarithmic tone-reproduction operator and the objective function.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus for contrast optimization and local adaptation for HDR compression of an HDR image, comprising:

a controller to calculate a regularization term and a contrast preservation term of an objective function;

a logarithmic tone-reproduction operator to produce a reference image;

a processor to obtain a compressed luminance from the objective function as applied to the reference image; and a compressor to compress the HDR image by applying a gain term at least partially based on the compressed luminance to the HDR image.

2. The apparatus of claim 1, wherein the compressor is to divide a luminance $Y_{HDR}$ by the compressed luminance $Y_{LDR}$ to determine the gain term.

3. The apparatus of claim 1, wherein the processor is to implement an iterated conditional mode to obtain the compressed luminance.

4. The apparatus of claim 1, wherein the controller is to modify a regularization parameter of the regularization term to introduce additional information to the objective function.

5. The apparatus of claim 1, wherein the regularization term comprises a regularization parameter that increases as a likelihood that a neighborhood of the reference image contains a strong edge increases.

6. The apparatus of claim 1, wherein the contrast preservation term comprises a weighting factor to determine significant contrast ratios of a current neighborhood of pixels.

7. The apparatus of claim 1, wherein the contrast preservation term is to maintain relative ratios of luminance between neighboring pixels.

8. The apparatus of claim 1, wherein the logarithmic tone-reproduction operator is to calculate the reference image by compressing an input image.

9. The apparatus of claim 1, wherein the compressed luminance is obtained via an iterative solution of the objective function.

10. The apparatus of claim 1, wherein optimization parameters are applied to the logarithmic tone-reproduction operator and the objective function.

11. A method, comprising:

calculating, via a processor, a regularization term and a contrast preservation term of an objective function;

producing a reference image;

obtaining a compressed luminance from the objective function as applied to the reference image; and compressing an HDR image by applying a gain term to the HDR image at least partially based on the compressed luminance.

12. The method of claim 11, wherein a luminance $Y_{HDR}$ is divided by the compressed luminance $Y_{LDR}$ to determine the gain term.

13. The method of claim 11, wherein the compressed luminance is obtained via an iterated conditional mode.

14. The method of claim 11, wherein the regularization term comprises a regularization parameter to introduce additional information to the objective function to solve the objective function.

15. The method of claim 11, wherein the regularization term comprises a regularization parameter that increases as a likelihood that a neighborhood of the reference image contains a strong edge increases.

16. The method of claim 11, wherein the contrast preservation term comprises a weighting factor to determine significant contrast ratios of a current neighborhood of pixels.

17. The method of claim 11, wherein the contrast preservation term is to maintain relative ratios of luminance between neighboring pixels.

18. The method of claim 11, wherein a logarithmic tone-reproduction operator is to produce the reference image by compressing an input image.

19. The method of claim 11, wherein the compressed luminance is obtained via an iterative solution of the objective function.

20. The method of claim 11, wherein optimization parameters are applied to a logarithmic tone-reproduction operator and the objective function.

21. At least one non-transitory machine-readable medium having instructions stored therein that, in response to being executed on a computing device, cause the computing device to:

calculate, via a processor, a regularization term and a contrast preservation term of an objective function;

produce a reference image;

obtain a compressed luminance from the objective function as applied to the reference image; and compress a high dynamic range (HDR) image by applying a gain term at least partially based on the compressed luminance to the HDR image.

22. The machine-readable medium of claim 21, wherein a luminance $Y_{HDR}$ is divided by the compressed luminance $Y_{LDR}$ to determine the gain term.

23. The machine-readable medium of claim 21, wherein the compressed luminance is obtained via an iterated conditional mode.

24. The machine-readable medium of claim 21, the regularization term comprises a regularization parameter to introduce additional information to the objective function to solve the objective function.

25. The machine-readable medium of claim 21, wherein the regularization term comprises a regularization parameter that increases as a likelihood that a neighborhood of the reference image contains a strong edge increases.

* * * * *